Jan. 29, 1935.  E. R. SAGE  1,989,627

METHOD AND APPARATUS FOR TESTING LUBRICANTS

Filed May 31, 1933  2 Sheets-Sheet 1

INVENTOR
Edwin R. Sage
BY
Warren S. Orton
ATTORNEY

Jan. 29, 1935. E. R. SAGE 1,989,627
METHOD AND APPARATUS FOR TESTING LUBRICANTS
Filed May 31, 1933 2 Sheets-Sheet 2

INVENTOR
*Edwin R. Sage.*
BY
*Warren S. Orton.*
ATTORNEY

Patented Jan. 29, 1935

1,989,627

UNITED STATES PATENT OFFICE 1,989,627

METHOD AND APPARATUS FOR TESTING LUBRICANTS

Edwin R. Sage, Jersey City, N. J., assignor to Improved Devices, Inc., Brooklyn, N. Y., a corporation of New York Application May 31, 1933, Serial No. 673,723

19 Claims. (Cl. 175—183)

The invention relates in general to a method for testing liquid and to an apparatus for use in practicing the method. The invention specifically relates to a method and apparatus for testing the lubricating qualities of oils and other lubricants particularly with reference to their viscosity and foreign matter content.

It has been known heretofore in the art of testing lubricants to position a sample of lubricant to be tested for its viscosity and purity between electrodes forming part of an electric testing circuit and while subjecting a layer of the lubricant to pressure to pass an electric current and measure the dielectric strength of the lubricant layer and in this way determine by the reading on a current indicating instrument a characteristic of the current passed through the liquid forming dielectric and in this way make a comparative test with a standard form of lubricant similarly measured for its dielectric strength.

It has also been suggested to measure electrically the thickness of a film of lubricant between two end thrust bearing surfaces where one of the surfaces is rotating.

These known methods have not proven satisfactory in practical use, among other reasons due to the fact that the only liquid actually measured is the layer of liquid which may happen to be positioned between the bearing surfaces at the instant of time the test was made, and which liquid layer or film may not be a fair sample of the total body of the lubricant under test. It has also been noted that readings which are obtained from time to time, even with the same lubricant, indicate variations, presumably due to the mechanical difficulties of providing uniformity in cross sectional area of the layer of lubricant under test and this in turn is caused by the difficulty of forming planular surfaces on the opposing faces of the electrode bearing surfaces despite the efforts which have been made heretofore to make these surfaces plane as by lapping operations.

The primary object of this invention is to provide a means for testing lubricant and like liquids and which will give a more accurate comparison with a standard than has been possible heretofore.

Broadly, this object is attained by avoiding the opposing planular surface forms of electrodes with their incidental difficulty both in manufacture and in practical operation above noted, and substituting therefore electrodes which can be designated generally as providing rolling contacts arranged and disposed so as to cause a film of the liquid under test to pass in a stream and to traverse one, or preferably a plurality of paths of electric current, and which electric paths distinguish from those in prior similar testing devices in that they are of the least possible cross sectional area.

It is also a characteristic of lubricant that the viscosity decreases with increase of temperature. With increase of temperature the lubricant, of course, becomes thinner with a resulting tendency in a testing device which is dependent upon forming the film to be tested under pressure to introduce a factor of error in the reading of the current characteristics employed to determine viscosity.

Accordingly, the present invention has for another object the providing of thermostatically controlled compensating mechanism calibrated to vary the pressure acting on the film and thus maintain constant the effective thickness of the film.

Another objectionable feature of similar devices now known is that under conditions where the same instrument is used rapidly and repeatedly to test different forms of lubricant the residue of the lubricant from a previous test is quite apt to influence the testing of a succeeding sample of lubricant.

Accordingly, another object of this invention is to provide a form of testing device which will be uninfluenced or substantially uninfluenced in any test by whatever may have been in the preceding test.

The invention has for other desideratum the providing of a simplified form of mechanism for practicing the method herein featured; to provide a testing device which will be at all times, after having once been set, in condition to function without necessity of intermediate changes or readjustments; which will be economic to operate, which can be easily cleaned and emptied of its contents; which will not injure its construction even when testing a lubricant having such poor lubricating value as may be subjected to pressure high enough to completely break down the film surface; which will automatically wash the testing surfaces while in use and which may be made of such small size that it can be installed as an attachment on an automobile to provide a constantly present means for testing the lubricating oil in the crank case.

Various other objects and advantages of the invention will be in part obvious from a consideration of the method features of the disclosure and from an inspection of the accompanying drawings and in part will be more fully set forth in the following particular description of one method of practicing the invention, and the invention also consists in certain new and novel modifications of the preferred method and other features of construction and combination of parts hereinafter set forth and claimed.

Figures 1, 3, 4:
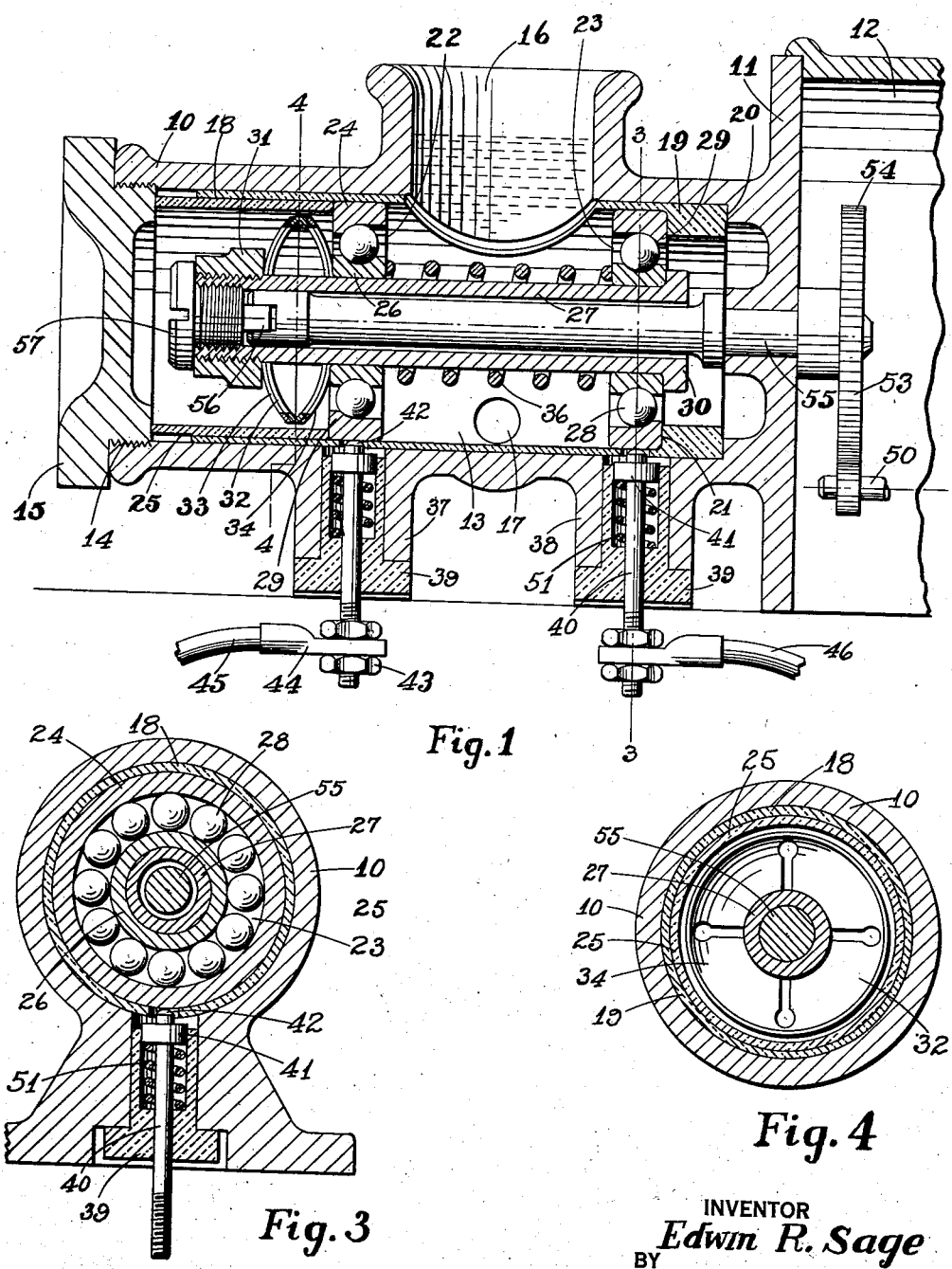
Fig. 1 is a view in vertical axial section taken through a preferred embodiment of the invention and showing the complete organization except for the source of electric energy and the current indicator which are usually positioned external to the parts shown in Fig. 1 and in convenient places.
Figure 2:
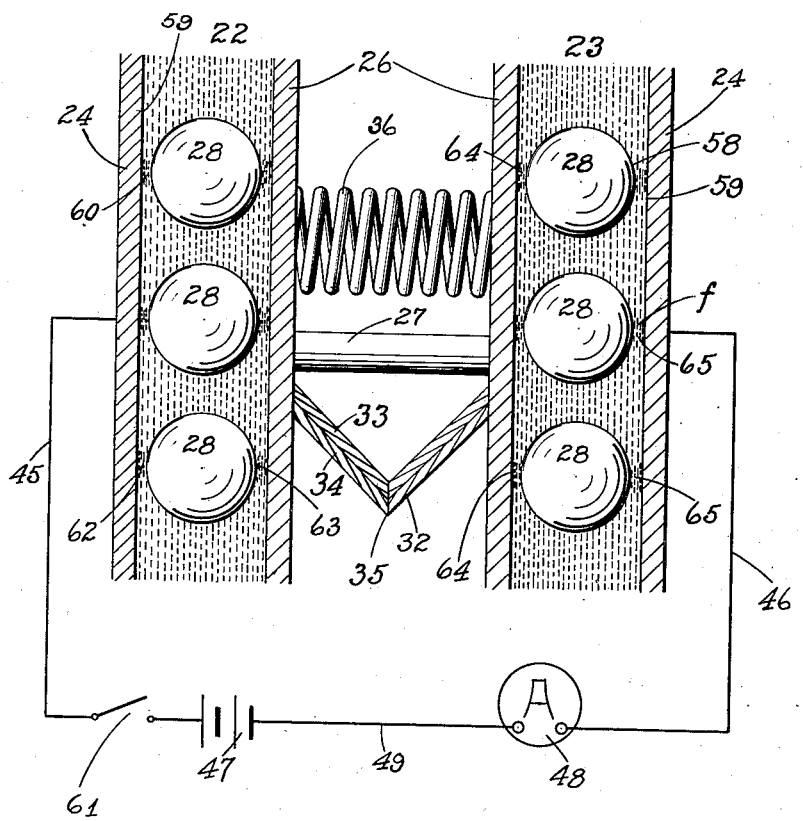
Fig. 2 is an enlarged diagrammatic explanatory view of some of the structural parts shown in Fig. 1 and with the film filled spaces between the balls and their races greatly magnified and out of proportion so as to show details of its configuration.
Figure 5:
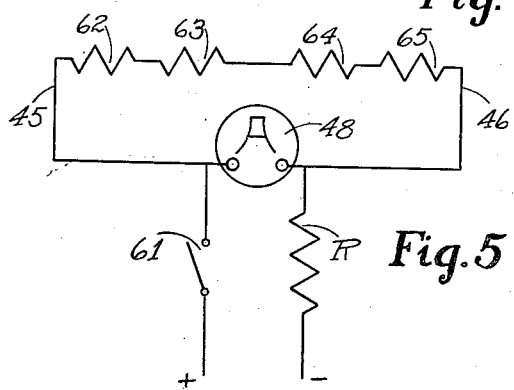

Figs. 3 and 4 are respectively transverse sectional views taken on the lines 3—3 and 4—4 of Fig. 1; and Fig. 5 is a diagrammatic view of a circuit constituting a modification of the external circuit shown in Fig. 2.

In the drawings and referring first to the showing in Fig. 1, there is disclosed a mechanism containing casing 10 divided by a partition 11 into a motor compartment 12 and a liquid containing and testing compartment 13. The compartment 13 is of somewhat cylindrical form and is provided at the end opposite the partition 11 with an opening 14 by means of which access is provided to the interior of the compartment and which opening is designed to be closed by a screw cap 15. The compartment 13 is provided centrally of its upper side with a funnel shaped opening 16 by means of which the liquid to be tested is introduced into the compartment. At its lower portion the compartment 13 is provided with a drain opening 17, normally closed by a suitable form of valve not shown.

Fitted within the compartment 13 is a lining sleeve 18 of insulating material provided at the end opposite the open end with a thickened portion 19 engaging a shoulder 20 at the partition 11 and forming an annular shoulder 21. Fitted within the sleeve 18 is a pair of ball bearings 22 and 23 positioned on opposite sides of the opening 16. Each of the ball bearings is provided with a ring-like outer race 24 with the outer race of ball bearing 23 engaging the annular shoulder 21 and held thereby from movement to the right in the showing in Fig. 1. The outer race 24 of the ball bearing 22 is similarly held from movement to the left of the showing in Fig. 1 by means of a spacer sleeve 25 formed of insulating material and fitted between the cap 15 and the outer race of the adjacent ball bearing 22. The inner races 26 of the ball bearings are slidably mounted upon an open end tubular quill 27, or, differently expressed, the quill is supported by the axially spaced ball bearings 22 and 23, the quill being intruded into and through the ring-like members 26 forming the inner races. The ball bearings are of somewhat conventional design, each provided with a plurality of spherical balls 28 disposed between the inner and outer races and retained in position conventionally by cages (not shown). The outer side of each of the outer races 24 is provided with an inwardly extending flange 29 to prevent outward movement axially of its associated several balls 28. The end of the quill adjacent the partition 11 is provided with an outstanding flange 30 constituting a stop for limiting the movement to the right of the inner race forming part of the ball bearing 23.

The opposite or left end of the quill 27 is threaded externally and this threaded portion is engaged by a retaining nut 31. Positioned between the retaining nut 31 and the inner race 26 of the left ball bearing 22 is a thermo-compensator 32.

This compensator is in the form of two dish-shaped discs 33 and 34 contacting along their contacting outer edges 35 and each disc formed of two metals of dissimilar coefficients of expansion. The compensator is somewhat elliptical in cross-section; is inserted on to the portion of the quill adjacent the retaining nut 31, bears at one side against this nut and at the opposite side against the sliding inner race 26 of the ball bearing 22, and the parts are so designed that with increase in temperature the compensator has a tendency to expand axially and thus tend to force the inner race of the left ball bearing 22 to the right of the showing in Fig. 1.

A coiled spring 36 encircles the central part of the quill 27 and bears at opposite ends against the inner races of the two ball bearings in a constantly present tendency to separate the same. This spring is so designed that normally it maintains a constant pressure on the inner races 26 and which inner races in turn bear on the line of balls 28 and through the line of balls acts to bear against the fixed outer races 24 of the two ball bearings 22 and 23.

The thermo-compensator 32 is designed initially or preset so that at a predescribed minimum temperature it is not exerting any appreciable thrust on the inner race engaged thereby but with increase in temperature the compensator in its tendency to expand axially acts contra to the expansive force of the spring and in this way the pressure transmitted through the ball bearings is varied with changes in temperature to compensate for changes in viscosity of testing material at the temperature conditions present.

One side of the casing 10 is provided in transverse alignment with the ball bearings 22 and 23 with a pair of outstanding bosses 37 and 38 into each of which is positioned a headed plug 39 of insulating material. Each plug has mounted therein a rod 40 the inner end of which is enlarged to provide a guide head 41 and positioned between this head and a shoulder formed in the plug is a spring 51. The inner end of the rod 40 beyond the head 39 constitutes a bearing contact 42 electrically connecting the rod 40, hereinafter referred to as a contactor, with the outer periphery of the adjacent outer races 24 of the ball bearings.

The contactors project externally from their respective plugs and are provided at their outer ends with binding screws 43 for securing terminals 44 of external leads 45 and 46.

The external leads are connected, 45 to one side of a source of electric energy 47, and the other 46 to one side of a current indicating instrument 48 herein shown to be an ammeter. A lead 49 connects the opposite side of the instrument as indicated diagrammatically in the showing in Fig. 2.

The quill 27 is designed to be rotated at constant speed and for this purpose there is provided a constant speed synchronous motor 50 mounted in the motor compartment 12 and provided with a reducing gear drive 53 including a gear 54 mounted on one end of a drive shaft 55 mounted for rotary movement in the partition 11 and projecting therefrom axially along the compartment 13. The drive shaft is telescoped in the quill 27 and at its free end is in driving engagement with the adjacent end of the quill, through the agency of a dog 56 carried at the inner end of a drive nut 57 internally threaded into the adjacent end of the quill.

Before the device is utilized it is set so as to give a standard reading to which any subsequent readings may be referred for comparison. For instance, where the instrument is designed to determine the lubricating qualities of a certain grade of lubricating oil, such, for instance, as might be used in an automobile crank case, the device is first tested by using a sample of pure lubricant having the desired viscosity and conducting these presetting tests at some selected low temperatures. With such a lubricant in the compartment 13 the tension of the spring 36 is preset and adjusted with reference to the thermo-compensator 32 so that such pressure is exerted through the ball bearing elements as will cause the balls 28 to intrude into the surface film *f* which is carried by the faces of the races 24 and 26 engaged by the balls 28; care being exercised in this initial setting to insure the presence of at least a thin film of the lubricant between the rolling surfaces 58 of the balls 28 and the adjacent faces 59 of the races. Under these conditions the portion of the film between opposite sides of the balls and their adjacent faces of the races are formed as areas of compressed film as indicated at 60 in Fig. 2.

Under these conditions the pointer of the current indicating instrument 48 is set at zero, or at any other selected graduation point on the scale of the instrument which indicates the dielectric strength of the sum of the several films when formed with a standard lubricant as herein indicated.

In operation a charge of the lubricant or other liquid to be tested is subsequently introduced into the compartment 13 to form a pool of the liquid of such capacity as will contain all of the rotating mechanism within the pool. Through suitable controls the motor is caused to rotate the shaft 55 and therethrough to rotate the quill 27 with its associated parts of the ball bearings at a speed sufficiently high to insure a free and rapidly changing flow of the liquid under test past and between the relatively movable elements of the ball bearings. When the parts are turning at the speed imposed thereon by the fixed speed of the motor, the electric testing circuit is closed as by means of the switch 61 and a reading taken from the instrument 48. It will be found that by the use of the device herein featured the pointer will move to a certain reading on the instrument and there remain substantially steady. The dial of the instrument may be graduated in any suitable scale which may be selected to indicate degrees of perfection in the lubricant under test, compared with the selected standard lubricant.

Tracing out the circuit, it will be noted that the current will pass from one side of the battery or source of energy 47 through the conductor 45 to the outer race of the left hand bearing 22 at which point it will bias into a number of paths one for each of the balls 28. It will thus be seen that the current will pass in series through each of the ball bearings passing from the outer race 24 across the path indicated at 62 in Fig. 2 through the metal balls 28 across the path 63 and into the inner race 26 of the ball bearing 22. Continue the tracing of the path of the electric current and it will be noted that it will pass along the quill 27 into the right hand inner race where it is again divided passing in series across the paths 64 through the right hand balls 28, film paths 65, into the outer race 24 and by means of the external conductor 46 to one side of the instrument 48 and therethrough and through the connecting conductor 49 back to the opposite side of the battery 47. It will thus be seen that the current path is in series, insofar as the two ball bearing assemblies are concerned, and is in parallel insofar as the paths across the balls of the ball bearings are concerned.

As the parts in the lubricant containing chamber are rotating during the testing period there results a constant stirring of the lubricant or other liquid and in this way any foreign matter, liquid or solid, is stirred into the pool and in this way a fair sample of the entire mass of lubricant is subjected to the test.

It is noted that not only is the body of lubricant moving, but the balls themselves in their rolling contact with the film between themselves and the races are constantly presenting new surfaces as electrodes or conducting paths and the balls in their rotary movement are exerting a tendency to feed the lubricant film circumferentially along the opposing faces of the races so that the increment and pressed film area of lubricant under test between each ball and its associated races are constantly changing. If it should so happen that a solid particle of foreign matter should move into any of the paths 62—65, it would not remain there long as it would be washed past the adjacent ball as the result of the stirring action which takes place in the bath during the testing operation. Of course, the presence of a particle of foreign material of high conducting capacity which might momentarily be caught in one of the film paths would change the dielectric strength of this particular path for the instant of time it is present, but due to the large number of balls used, in the instant case shown to be twenty-four and therefore forty-eight paths, any momentary error which may take place at one of the balls would have very little effect on the aggregate readings of all the paths as would be indicated on the instrument 48. In this respect the present disclosure constitutes a material improvement over known devices of the type above described where the presence of any such metal particle between opposing faces of the electrodes would, of course, provide a jump current path thus destroying any possibility of a measurement of the current indicating dielectric strength of the lubricant itself. In this way errors in the indicator readings have been minimized and it is simply the mean of all the films which controls the indicator reading.

With the device equipped with a thermo-compensating device such as illustrated herein, it would be immaterial as to whether the oil was hot or not, as the compensator is designed to compensate for change in viscosity and functions to increase the load on the bearings as the temperature of the oil is lowered by reducing its effort parallel to the quill 27.

At the end of the test the sample is drained from the casing, a new charge is placed therein for test and the device operated for a short period of time so as to remove from the ball bearings the film of old oil and replace the same with the new oil lubricant or other liquid under test. In those cases where succeeding tests are of entirely different material, it is, of course, necessary to wash the bearings entirely free of the old material before the new test material is introduced.

While the device has been described as a testing device for use as a commercial or laboratory instrument, it is to be understood that it might be mounted in any location or lubricant receptacle where it is desired to quickly test contained lubricant from time to time, and it is herein suggested that the device may be installed in the oil pan of an automobile power plant with the instrument 48 and switch 61 mounted on the dash board convenient for test whenever desired and that the battery 47 may be the conventional car battery.

When so used the presence of any foreign matter such as sludge, dilutions, acidity, metal and metal oxides and decreased viscosity may be quickly ascertained simply by throwing the switch and reading the instrument. In this way the driver of the vehicle is advised from time to time simply by throwing the switch 61 on the instrument board in front of him as to whether there is any necessity of changing the oil in the crank case.

By means of the device herein disclosed, the presence of oil having such poor lubricating value as may be subjected to bearing pressures high enough to completely break down the oil film will have no effect on the rolling contacts or any possibility of damaging them. It is particularly noted that the bearing surfaces are constantly subjected to a thorough washing action and this washing action continues during the entire period of the test so that a fair sample of the entire body of lubricant under test is passed between the multitude of balls at any instant of time during which the testing current is passing.

Referring to the modification of the external circuit shown in Fig. 5 it will be noted that a high resistance R is included in one of the leads from the source in this case a house service current supply. The current indicating instrument 48 is connected in multiple with the work resistance, 62, 63, 64 and 65.

The arrangements shown in Fig. 2 are of advantage when testing materials which do not vary materially from each other and where the reading occurs on the part of the scale where the graduations are widely spread apart. However, where materials of widely varying resistance characteristics are to be tested it is advisable to maintain a constant current characteristic in the testing circuit and under these conditions the arrangement of Fig. 5 is preferred.

While there has been shown, described and pointed out in the annexed claims, certain novel features of the invention, it will be understood that various omissions, substitutions and changes in the form and details of the device illustrated and in its operation may be made by those skilled in the art without departing from the spirit of the invention.

I claim:

1. In the art of testing lubricants, the method which consists in forming a pair of electrodes with a film of the lubricant to be tested therebetween, and with one of the electrodes presenting a continuously changing point contact to the lubricant between the same and the other electrode, causing a continuously changing engagement between the film and the first-named electrode while passing an electric current across the electrodes and simultaneously measuring the current thereby to determine the dielectric strength of said moving film of lubricant.

2. In the art of testing lubricants for their lubricating properties while under service conditions, the method which consists of causing an electric current to traverse a plurality of paths in a pool of the lubricant to be tested causing films of the lubricant to have relative movement across each of the paths of the electric current while maintaining the paths each at minimum cross sectional area and determining a physical characteristic imposed on said electric current.

3. In the art of testing lubricants, the method which consists in causing a plurality of films of the lubricant simultaneously to traverse the path of an electric current in such way that the lubricant flow crosses the electric path at spaced apart points, while subjecting each succeeding unit length of the flow at each point to a constant pressure during the instant of time it is in the electric path thereby to cause the flow to be in the form of a film under said constant pressure while in said electric path and measuring the magnitude of the electric current as affected by said lubricant film.

4. In the art of testing liquids and comparing the same with a standard, the method which consists in simultaneously passing an electric testing current along a plurality of paths disposed in series and each with a minimum cross sectional area, causing films of the liquid to be tested to pass simultaneously and under constant pressure across said plurality of electric paths and recording a physical characteristic of said testing current as affected by the pressure of said films of liquid.

5. In a device for testing lubricants for viscosity and purity, the combination of a container provided with a compartment for containing a charge of the lubricant to be tested, a cylindrical sleeve of insulating material outlining said compartment, a drive shaft extending axially of said insulating sleeve, a quill telescoping said shaft and having a driving connection therewith at one end, a retaining unit on the quill at said end and said quill having an outstanding flange forming shoulder at the other end, a pair of ball bearings in the compartment and adapted to be contained in the charge of lubricant to be tested, said ball bearings having their outer races fitted in said sleeve and fixed against axial movement, with their inner races slidably mounted in the quill, with one of the inner races engaging said shoulder, a spring coiled about the quill and bearing at opposite ends on said inner races to force them in opposite directions, a resilient thermo compensator between the retaining nut and the inner races of the adjacent ball bearing tending to resist the spring with increase in temperature, and means forming an electric testing circuit, said means including said pair of ball bearings and the quill and also including a pair of spring pressed contactors carried by the container and bearing at their inner ends in electric engagement with said outer races and having their outer ends exposed for connection with external electric leads.

6. In a device of the class described, the combination of a liquid container, a pair of ball bearings axially spaced apart in the container, means for insulating the ball bearings from the container, a pair of stops engaging the outer races of the ball bearings to prevent any axial separating movement thereof, a quill mounted in the inner races of said ball bearings and capable of axial movement relative thereto, a spring tending to separate the inner races and thus place pressure on the balls of the bearings and cause them to form between themselves and their races films of the liquid in the container, a drive shaft telescoped by the quill and in driving engagement therewith, and means forming an electric testing circuit, said means including said ball bearings and the quill constituting an electric connection therebetween, and a pair of contactors in electric engagement with the outer races, having their outer ends exposed for connection with other parts forming the electric circuit.

7. In a lubricant testing device, the combination of a container having a compartment for forming a pool of the lubricant to be tested, means for testing the lubricant in the pool, said means forming an electric circuit and including parts external of the container and parts within the lubricant pool in the container, the external parts comprising a source of electric energy, a current indicating instrument and a lead connecting one side of the source to one side of the instrument, the parts within the container comprising a shaft of conducting material, a pair of axially spaced ball bearings of conducting material supporting the shaft, a lead connecting the outer race of one of the ball bearings with the other side of the source, a lead connecting the outer race of the other ball bearing with the other side of the instrument, a compression spring encircling the shaft and bearing at opposite ends on the inner races of the ball bearing thereby to force the inner races axially against the balls of the ball bearings and therethrough to force the balls against the outer races, thermostatically actuated means operatively connected to the shaft and ball bearings to vary the pressure between the balls and their races automatically by change in temperature of the parts of the testing means within the container and means for rotating the shaft.

8. In a lubricant testing device, the combination of a container having a compartment for forming a pool of the lubricant to be tested, means for testing the lubricant in the pool, said means forming an electric circuit and including parts external of the container and parts within the lubricant pool in the container, the external parts comprising a source of electric energy, a current indicating instrument and a lead connecting one side of the source to one side of the instrument, the parts within the container comprising a shaft of conducting material, a pair of axially spaced ball bearings of conducting material supporting the shaft, a lead connecting the outer race of one of the ball bearings with the other side of the source, a lead connecting the outer race of the other ball bearing with the other side of the instrument, a compression spring encircling the shaft and bearing at opposite ends on the inner races of the ball bearing thereby to force the inner races axially against the balls of the ball bearings and therethrough to force the balls against the outer races and means for rotating the shaft.

9. In a lubricant testing device, the combination of a container having a compartment for forming a pool of the lubricant to be tested, means for testing the lubricant in the pool, said means forming an electric circuit and including parts external of the container and parts within the lubricant pool in the container, the external parts comprising a source of electric energy, a current indicating instrument and a lead connecting one side of the source to one side of the instrument, the parts within the container comprising a shaft of conducting material, a pair of axially spaced ball bearings of conducting material supporting the shaft, a lead connecting the outer race of one of the ball bearings with the other side of the source, a lead connecting the outer race of the other ball bearing with the other side of the instrument and means for rotating the shaft.

10. In a lubricant testing device, the combination of a container for the lubricant, means for testing the lubricant, said means comprising an electric circuit including a pair of ball bearings of conducting material axially spaced apart in the container and a shaft of conducting material mounted in the pair of ball bearings and constituting a conductor for electrically connecting the inner races of the ball bearings, means controlled by variations in the temperature present for automatically varying said pressure and means for rotating the shaft.

11. In a lubricant testing device, the combination of a container for the lubricant, means for testing the lubricant, said means comprising an electric circuit including a pair of ball bearings of conducting material axially spaced apart in the container and a shaft of conducting material mounted in the pair of ball bearings and constituting a conductor for electrically connecting the inner races of the ball bearings, means for imposing pressure equally on both of the ball bearings thereby to form a uniform film of lubricant between each ball of the ball bearing and its associated inner and outer races, and means for rotating the shaft.

12. In a lubricant testing device, the combination of a container for the lubricant, means for testing the lubricant, said means comprising an electric circuit including a pair of ball bearings of conducting material axially spaced apart in the container and a shaft of conducting material mounted in the pair of ball bearings and constituting a conductor for electrically connecting the inner races of the ball bearings and means for rotating the shaft.

13. In a device for testing liquids, the combination of a container adapted to form a pool of the liquid to be tested, means forming an electric testing circuit, said means including mechanism forming a rolling contact contained in the pool and revolvable about a horizontal axis and presenting a continuously changing surface to a film of the liquid to be tested, pressure means acting on the rolling contact for placing the film of liquid under pressure while passing an electric current through the film.

14. In a device for testing liquids, the combination of means forming an electric circuit, including a source of electric energy, a current indicating instrument, a plurality of electric devices disposed in parallel in said circuit, a container for the liquid to be tested in which said devices are contained, each of said devices including mechanism forming a plurality of current paths disposed in series, each of said mechanism including a roller and guideway therefor having relative bodily and rotary movement and adapted to form a film of the liquid to be tested between the roller and its associated guideway.

15. In a liquid testing device, the combination of a container adapted to contain a pool of the liquid to be tested, mechanism in said pool including a roller and a vertically disposed guideway, said roller being free to roll in said guideway and adapted as it rolls to form a thin and continuously changing film of the liquid to be tested between the roller and the guideway, means for imposing a pressure on said film, and means including said roller and its guideway forming an electric testing circuit.

16. In a liquid testing device, the combination of a container adapted to contain a pool of the liquid to be tested, mechanism in said pool including a roller and guideway therefor, said roller being free to roll in said guideway and adapted as it rolls to form a film of the liquid to be tested between the roller and the guideway, means for imposing a pressure on said film, and thermostatically controlled means for varying the pressure on the film and means including said roller and its guideway forming an electric testing circuit.

17. In a device of the class described, the combination of a container adapted to contain a pool of liquid to be tested, mechanism mounted in the pool for rotary movement and acting to stir the liquid in the pool, means for driving the mechanism at constant speed, a ball bearing contained in the pool and constituting a mounting for said mechanism, constantly acting pressure means acting on the ball bearing and tending to place uniform pressure on the liquid between the relatively movable elements of the ball bearing, and means for measuring the sums of the thicknesses of the liquid at any instant of time between the relatively movable elements of the ball bearing.

18. In an apparatus for testing lubricants, the combination with a lubricant container, testing mechanism therein comprising a fixed support, a member mounted for rotary movement about a horizontal axis, means for rotating said member, anti-friction mechanism for supporting the rotary member from the fixed support, means for passing an electric current across the anti-friction mechanism and means for indicating a characteristic of said current.

19. In a liquid testing device, the combination of means forming an electric circuit, said means including two similar electrical instruments arranged in the circuit in parallel and each of said instruments providing a plurality of paths for the current with the paths disposed in series in each instrument, each of said paths including a fixed electrode and a rolling electrode, means for pressing one of the electrodes towards the other and means for containing said electrodes with their associated electric paths in a pool of the liquid to be tested.

EDWIN R. SAGE.